United States Patent
Lee et al.

(10) Patent No.: US 10,127,905 B2
(45) Date of Patent: Nov. 13, 2018

(54) APPARATUS AND METHOD FOR GENERATING ACOUSTIC MODEL FOR SPEECH, AND APPARATUS AND METHOD FOR SPEECH RECOGNITION USING ACOUSTIC MODEL

(71) Applicant: Samsung Electronics Co., Ltd., Suwon-si (KR)

(72) Inventors: HoShik Lee, Seongnam-si (KR); Hee Youl Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 15/231,909

(22) Filed: Aug. 9, 2016

(65) Prior Publication Data
US 2017/0076719 A1 Mar. 16, 2017

(30) Foreign Application Priority Data
Sep. 10, 2015 (KR) ........................ 10-2015-0128456

(51) Int. Cl.
*G10L 15/20* (2006.01)
*G10L 15/16* (2006.01)
(Continued)

(52) U.S. Cl.
CPC .............. *G10L 15/20* (2013.01); *G10L 15/02* (2013.01); *G10L 15/063* (2013.01); *G10L 15/16* (2013.01);
(Continued)

(58) Field of Classification Search
CPC ....... G10L 15/20; G10L 25/84; G10L 15/063; G10L 15/02; G10L 15/16; G10L 2015/025
(Continued)

(56) References Cited

U.S. PATENT DOCUMENTS 5,712,922 A * 1/1998 Loewenthal ......... G06K 9/2036
                                                                            382/155
6,178,398 B1 * 1/2001 Peterson ............. G10L 15/1822
                                                                            704/232
(Continued)

FOREIGN PATENT DOCUMENTS

EP           0 566 015 A2   10/1993
KR   10-2008-0114023 A      12/2008
(Continued)

OTHER PUBLICATIONS

Giri, Ritwik, et al. "Improving speech recognition in reverberation using a room-aware deep neural network and multi-task learning." Acoustics, Speech and Signal Processing (ICASSP), 2015 IEEE International Conference on. IEEE, 2015.*
(Continued)

*Primary Examiner* — Edwin S Leland, III
(74) *Attorney, Agent, or Firm* — NSIP Law

(57) ABSTRACT

Described are an apparatus and method for generating to generate an acoustic model. The apparatus and method include a processor a processor configured to calculate a noise representation that represents noise data by using a noise model, and generate the acoustic model through training using training noisy speech data, which comprises speech data and the noise data, a string of phonemes corresponding to the speech data, and the noise representation.

34 Claims, 10 Drawing Sheets

(51) Int. Cl.
  *G10L 25/84* (2013.01)
  *G10L 15/06* (2013.01)
  *G10L 15/02* (2006.01)

(52) U.S. Cl.
  CPC ........ *G10L 25/84* (2013.01); *G10L 2015/025* (2013.01)

(58) Field of Classification Search
  USPC ........................................................ 704/232
  See application file for complete search history.

(56) References Cited

U.S. PATENT DOCUMENTS

| | | | | |
|---|---|---|---|---|
| 6,691,082 | B1* | 2/2004 | Aguilar | G10L 19/0208 704/219 |
| 7,092,881 | B1* | 8/2006 | Aguilar | G10L 19/093 704/207 |
| 8,069,049 | B2* | 11/2011 | Nilsson | G10L 21/0364 704/500 |
| 8,071,972 | B2* | 12/2011 | Lu | B82Y 10/00 257/5 |
| 8,440,467 | B2* | 5/2013 | Tour | B82Y 10/00 422/82.01 |
| 8,484,022 | B1* | 7/2013 | Vanhoucke | G10L 15/063 700/48 |
| 8,972,256 | B2* | 3/2015 | Rennie | G10L 21/0208 704/233 |
| 2010/0081958 | A1* | 4/2010 | She | A61B 5/0031 600/544 |
| 2017/0011738 | A1* | 1/2017 | Senior | G10L 15/063 |
| 2017/0076719 | A1* | 3/2017 | Lee | G10L 15/02 |
| 2017/0249445 | A1* | 8/2017 | Devries | G16H 10/60 |

FOREIGN PATENT DOCUMENTS

| | | |
|---|---|---|
| KR | 10-2011-0101287 A | 9/2011 |
| WO | WO 02/35710 A2 | 5/2002 |
| WO | WO 2008/042900 A2 | 4/2008 |

OTHER PUBLICATIONS

Feng, Xue, Yaodong Zhang, and James Glass. "Speech feature denoising and dereverberation via deep autoencoders for noisy reverberant speech recognition." Acoustics, Speech and Signal Processing (ICASSP), 2014 IEEE International Conference on. IEEE, 2014.*

Extended European Search Report dated Feb. 13, 2017 in counterpart European Patent Application No. 16187723.8 (9 pages, in English).

Feng, Xue, Yaodong Zhang, and James Glass. "Speech Feature Denoising and Dereverberation Via Deep Autoencoders for Noisy Reverberant Speech Recognition." *Acoustics, Speech and Signal Processing (ICASSP)*, 2014 IEEE International Conference on. IEEE, 2014. (6 pages, in English).

Giri, Ritwik, et al. "Improving Speech Recognition in Reverberation Using a Room-Aware Deep Neural Network and Multi-Task Learning." *Acoustics, Speech and Signal Processing (ICASSP)*, 2015 IEEE International Conference on. IEEE, 2015. (6 pages, in English).

Seltzer, Michael L., Dong Yu, and Yongqiang Wang. "An Investigation of Deep Neural Networks for Noise Robust Speech Recognition." *Acoustics, Speech and Signal Processing (ICASSP)*, 2013 IEEE International Conference on. IEEE, 2013. (6 pages, in English).

Yin, Shi, et al. "Noisy Training for Deep Neural Networks in Speech Recognition." *EURASIP Journal on Audio, Speech, and Music Processing* 2015.1 (2015): 1-14. (14 pages, in English).

* cited by examiner

APPARATUS AND METHOD FOR GENERATING ACOUSTIC MODEL FOR SPEECH, AND APPARATUS AND METHOD FOR SPEECH RECOGNITION USING ACOUSTIC MODEL

CROSS-REFERENCE TO RELATED APPLICATION(S)

This application claims the benefit under 35 USC 119(a) of Korean Patent Application No. 10-2015-0128456, filed on Sep. 10, 2015, in the Korean Intellectual Property Office, the entire disclosure of which is incorporated herein by reference for all purposes.

BACKGROUND

1. Field

The following description relates to speech recognition technology, and more particularly to an apparatus and method for generating an acoustic model and an apparatus and method for speech recognition.

2. Description of the Related Art

There is a great interest in speech recognition technology because speech recognition enables users to access information from the Internet, e-commerce, and various ubiquitous environments in a more convenient and easier manner. For instance, in a situation in which both hands of a user are busy driving a vehicle or conducting other activity, speech recognition enables the user to access the Internet, search, dial, and conduct a phone call, or conduct other activities or work, thus, satisfying various needs of the user.

One important point in speech recognition is to effectively remove noise generated by ambient conditions. Disparity, caused by such noise, between a training environment and a real speech recognition environment is one of main factors that deteriorate speech recognition performance of a system.

Accordingly, there is a need for a technology that may generate an acoustic model to train the speech recognition system in an electronic device, such as a mobile phone, to be robust and not affected or significantly affected by noise, and may be used in a real speech recognition environment where various noises exist.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are an apparatus and method for generating an acoustic model that is robust to noise, and an apparatus and method for speech recognition by using an acoustic model that is robust to noise.

In accordance with an embodiment, there is provided an apparatus to generate an acoustic model, the apparatus including: a processor configured to calculate a noise representation that represents noise data by using a noise model, and generate the acoustic model through training using training noisy speech data, which may also include speech data and the noise data, a string of phonemes corresponding to the speech data, and the noise representation.

The apparatus may also include a memory configured to store instructions, wherein the processor may be further configured to execute the instructions to configure the processor to calculate the noise representation that represents noise data by using the noise model, and generate the acoustic model through training using the training the noisy speech data, which may also include the speech data and the noise data, the string of phonemes corresponding to the speech data, and the noise representation.

The processor may also include: a noise representation calculator configured to calculate the noise representation that represents noise data by using the noise model; and an acoustic model generator configured to generate the acoustic model through training using the training the noisy speech data, which may also include the speech data and the noise data, the string of phonemes corresponding to the speech data, and the noise representation.

The noise representation calculator may also include: a feature extractor configured to extract a feature of the noise data; and a noise modeler configured to calculate the noise representation that represents the noise data based on the extracted feature by using the noise model.

The noise model may be generated in advance through an auto-encoder using training noise data.

The generated acoustic model may be an acoustic model based on a neural network.

The processor may be configured to generate the acoustic model by using a multi-task learning method.

The processor generates the acoustic model by using a third objective function obtained from a weighted sum of a first objective function and a second objective function, wherein the first objective function may be used to estimate a phoneme probability, and the second objective function may be used to estimate the noise representation.

The acoustic model generator may also include: a combiner configured to combine the speech data and the noise data to generate the training noisy speech data; a feature extractor configured to extract a feature of the generated training noisy speech data; and an acoustic model trainer configured to train the acoustic model with the extracted feature, the string of phonemes corresponding to the speech data, and the noise representation.

In accordance with another embodiment, there is provided a method of generating an acoustic model, the method including: calculating a noise representation of noise data by using a noise model; and generating the acoustic model using training noisy speech data that may also include speech data and the noise data, a string of phonemes corresponding to the speech data, and the noise representation.

The calculating of the noise representation may also include: extracting a feature of the noise data; and calculating the noise representation based on the extracted feature of the noise data by using the noise model.

The noise model may be generated in advance through the auto-encoder using training noise data.

The generated acoustic model may be an acoustic model based on a neural network.

The generating of the acoustic model may also include generating the acoustic model by using a multi-task learning method.

The generating of the acoustic model may also include generating the acoustic model by using a third objective function obtained from a weighted sum of a first objective function and a second objective function, wherein the first objective function may be used to estimate a phoneme probability, and the second objective function may be used to estimate the noise representation.

The generating of the acoustic model may also include: combining the speech data and the noise data to generate the training noisy speech data; extracting a feature of the generated training noisy speech data; and training the acoustic model with the extracted feature, the string of phonemes corresponding to the speech data, and the noise representation.

In accordance with one embodiment, there is provided a speech recognition apparatus, including: a storage configured to store an acoustic model; and a calculator configured to calculate a phoneme probability of input noisy speech data by using the stored acoustic model, wherein the acoustic model may be generated by training using a training noisy speech data including a combination of speech data and noise data, a phoneme probability corresponding to the speech data, and noise representation that represents the noise data.

The calculator may also include: a feature extractor configured to extract a feature of the input noisy speech data; and a phoneme probability calculator configured to use the acoustic model to calculate a phoneme probability corresponding to the extracted feature.

The noise representation may be calculated by using a noise model.

The noise model may be generated in advance through an auto-encoder using training noise data.

The acoustic model may be an acoustic model based on a neural network.

The acoustic model may be generated by using a multi-task learning method.

The acoustic model may be generated by using a third objective function obtained from a weighted sum of a first objective function and a second objective function, wherein the first objective function may be used to estimate a phoneme probability, and the second objective function may be used to estimate the noise representation.

The acoustic model may be generated with the training noisy speech data being defined as input data, and the string of phonemes corresponding to the speech data and the noise representation being defined as target data.

In accordance with a further embodiment, there is provided a speech recognition method, including: extracting a feature of input noisy speech data; and calculating a phoneme probability, corresponding to the extracted feature, by using the acoustic model, wherein the acoustic model may be generated by training using a training noisy speech data, including a combination of speech data and noise data, a phoneme probability corresponding to the speech data, and noise representation that represents the noise data.

The noise representation may be calculated by using a noise model.

The noise model may be generated in advance through an auto-encoder using training noise data.

The acoustic model may be an acoustic model based on a neural network.

The acoustic model may be generated by using a multi-task learning method.

The acoustic model may be generated by using a third objective function obtained from a weighted sum of a first objective function and a second objective function, wherein the first objective function may be used to estimate a phoneme probability, and the second objective function may be used to estimate the noise representation.

The acoustic model may be generated with the training noisy speech data being defined as input data, and the string of phonemes corresponding to the speech data and the noise representation being defined as target data.

In accordance with another embodiment, there is provided an apparatus to generate an acoustic model, including: a combiner configured to combine speech data and noise data to generate training noisy speech data; a feature extractor configured to extract features from the noisy speech data by differentiating the noisy speech data for the acoustic model training from other noise data; and an acoustic model trainer configured to train the acoustic model with the features from the noisy speech data, a string of phonemes corresponding to the speech data, and noise representation corresponding to the noise data, wherein classification of the phonemes and extraction of the noise representation are concurrently performed.

The apparatus may also include: an auto-encoder configured to receive input of features to calculate an input representation based on received input of training speech data, and reconstruct output that may be most similar to the input based on the input representation.

The auto-encoder generates in advance the noise model using training noise data.

The generated acoustic model may be an acoustic model based on a neural network.

Other features and aspects will be apparent from the following detailed description, the drawings, and the claims.

Figure 1:
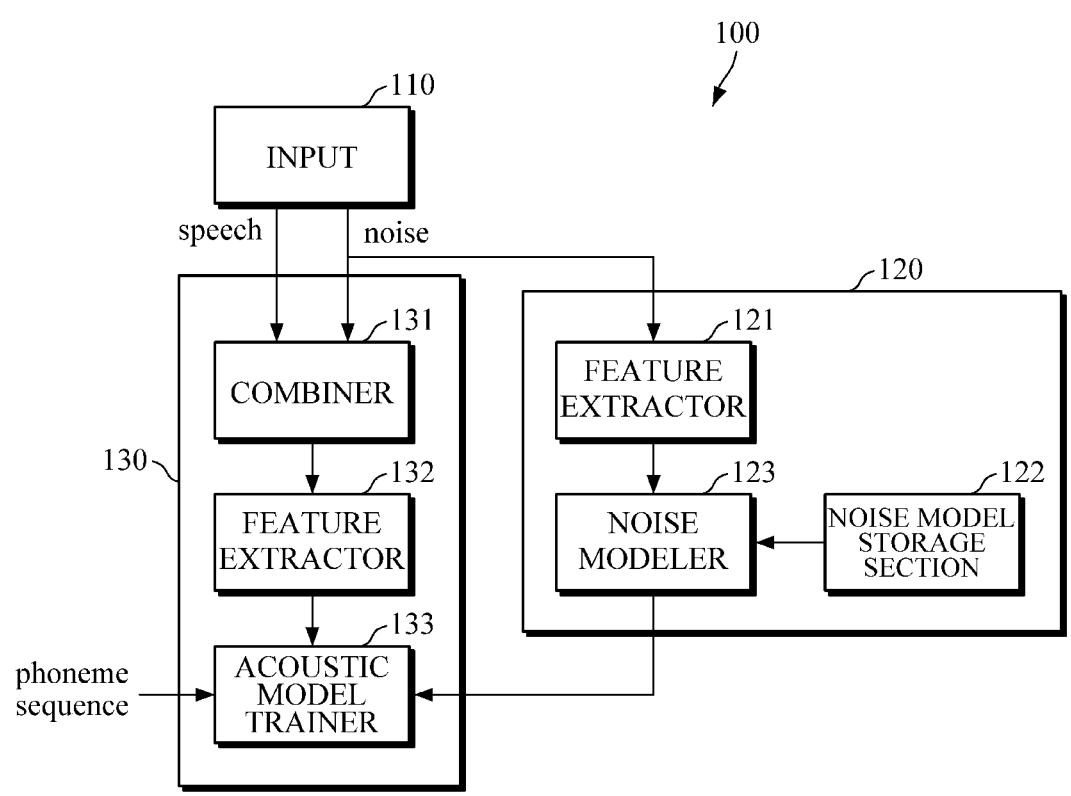
FIG. 1 is a block diagram illustrating an apparatus to generate an acoustic model, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a block diagram illustrating an apparatus to generate an acoustic model, in accordance with an embodiment.

Referring to FIG. 1, the apparatus 100 for generating an acoustic model includes an input 110, a noise representation calculator 120, and an acoustic model generator 130.

The input 110 is a gate, a terminal, or a microphone that receives input of training speech data to generate an acoustic model (hereinafter referred to as speech data for acoustic model training), and training noise data to also be used generate the acoustic model (hereinafter referred to as noise data for the acoustic model training).

The noise representation calculator 120 is a processor, a controller, a circuit, or a calculator configured to calculate noise representation using a pre-generated noise model. The noise representation represents the noise data for the acoustic model training. To this end, the noise representation calculator 120 includes a feature extractor 121, a noise model storage section 122, and a noise modeler 123.

The feature extractor 121 is a processor, a controller, or a circuit configured to extract features of the noise data for acoustic model training by executing an extraction algorithm. The extraction algorithm may be an algorithm of any type or function as long as the algorithm may be used to extract features that differentiate the noise data for acoustic model training from other noise data.

The noise model storage section 122 is a memory or a circuit configured to store a noise model. In one embodiment, the noise model is generated by training in advance through an auto-encoder by using various training noise data (hereinafter referred to as noise data for noise model training). The noise data for noise model training may include all types of noise data, including the noise data for acoustic model training that is used to generate an acoustic model.

The noise model storage section 122 is a memory or a circuit that includes at least one storage medium among flash memory type, hard disk type, multi-media card micro type, card type memory (e.g., SD or XD memory, etc.), random access memory (RAM), static random access memory (SRAM), read-only memory (ROM), electrically erasable programmable read only memory (EEPROM), programmable read only memory (PROM), magnetic memory, magnetic disks, optical discs, and other similar devices.

Although the noise model storage section 122 is included in the noise representation calculator 120 in FIG. 1, the noise model storage section 122 is not limited thereto. In other words, the noise model storage section 122 may be positioned to be part of the noise representation calculator 120, or be an external structural element outside the noise representation calculator 120.

By using the noise model stored in the noise model storage section 122, the noise modeler 123 calculates noise representation, which represents the noise data to be used to generate the acoustic model training, based on features of the noise data for the acoustic model training that are extracted by the feature extractor 121.

Generation and use of the noise model will be described with reference to FIG. 2.

The acoustic model generator 130 is a processor, a controller, or a structural generator configured to generate an acoustic model through training based on the speech data for acoustic model training, the noise data for acoustic model training, a string of phonemes corresponding to the speech data for acoustic model training, and the noise representation of the noise data for acoustic model training. In an embodiment, the acoustic model generator 130 generates an acoustic model by using a multi-task learning method. To this end, the acoustic model generator 130 includes a combiner 131, a feature extractor 132, and an acoustic model trainer 133.

The combiner 131 is a processor, a controller, or a circuit configured to combine the speech data and the noise data for the acoustic model training to generate training noisy speech data (hereinafter referred to as noisy speech data for the acoustic model training).

The feature extractor 132 is a processor, a controller, or a circuit configured to extract features from the noisy speech data for the acoustic model training by using, for example, an algorithm, to differentiate the noisy speech data for the acoustic model training from other noise data. As described above, the algorithm may be an algorithm of any type or function as long as the algorithm may be used to extract features that differentiate the noisy speech data for the acoustic model training from other noise data.

The acoustic model trainer 133 is a processor or a controller that is configured to train the acoustic model with the features of the noisy speech data for the acoustic model training from the feature extractor 132, a string of phonemes corresponding to the speech data for the acoustic model training, and the noise representation from the noise modeler 123 of the noise data for the acoustic model training being defined as target data. In other words, the acoustic model trainer 133 trains the acoustic model so that the acoustic model performs classification of phonemes and extraction of noise representation at the same time by using a multi-task learning method.

The acoustic model may be a neural network-based acoustic model, but is not limited thereto.

The neural network-based acoustic model may include a plurality of hidden layers, and may be trained by a typical error back propagation method.

In an embodiment, the acoustic model trainer 133 trains an acoustic model by using an objective function represented by the following Equation 1.

$$L=(1-\lambda)L_A+\lambda L_N,\qquad\text{[Equation 1]}$$

wherein $L_A$ an objective function used to train an acoustic model to estimate phoneme probabilities (hereinafter referred to as first objective function), and $L_N$ is an objective function used to train an acoustic model to estimate noise representation (hereinafter referred to as second objective function).

As represented by Equation 1, the objective function used to train an acoustic model is obtained from a weighted sum of the first objective function and the second objective function.

In an embodiment, the first objective function $L_A$ uses the cross-entropy, which is generally used for multi-class classification, and is represented by the following Equation 2.

$$L_A = -\sum_{k=1}^{K} t_k \ln y_k, \; t_k = 0 \text{ or } 1,\qquad\text{[Equation 2]}$$

wherein K indicates the number of output classes (for instance, the number of phonemes), and $t_k$ has a value of '1' in the case of a target class, and a value of '0' in the case where $t_k$ is not a target class.

In an embodiment, the second objective function $L_N$ uses an Euclidian distance, which is generally used for regression, and is represented by the following Equation 3.

$$L_N = \frac{1}{2}\sum_{p=1}^{P} \|f_p - g_p\|^2,\qquad\text{[Equation 3]}$$

wherein P indicates the dimension of an input (output) feature, $f_p$ indicates an activation value of P-th input nodes, and $g_p$ indicates an activation value of P-th output nodes.

Although the apparatus 100 to generate an acoustic model includes the input 110 and the noise model storage section 122 in FIG. 1, the input 110 and the noise model storage section 122, are optional structural elements that may be included based on performance and use of a system.

Figure 2:
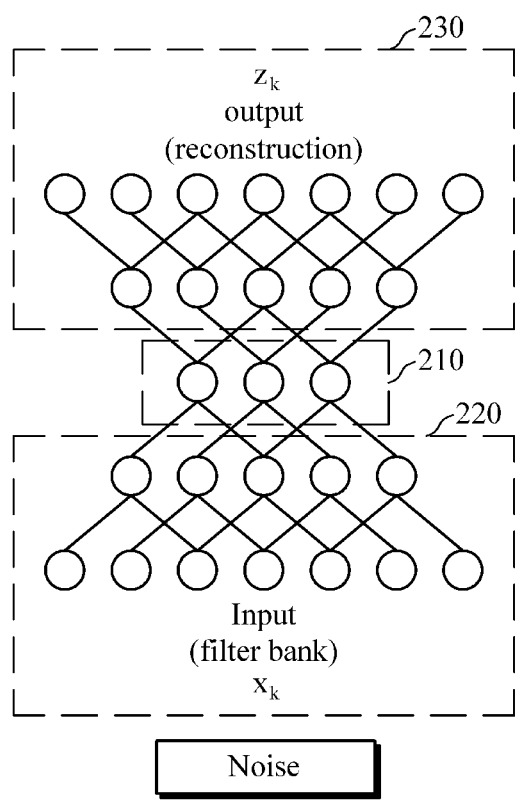
FIG. 2 is a diagram explaining an example of generating a noise model, in accordance with an embodiment.

FIG. 2 is a diagram explaining an example to generate a noise model, in accordance with an embodiment. The noise model illustrated in FIG. 2 is a noise model based on an auto-encoder.

In an embodiment, the noise model may be trained through an auto-encoder. The auto-encoder includes a plurality of hidden layers, and is trained to receive input of features, such as filterbank, to calculate an input representation 210 based on the received input, and to reconstruct output that is most similar to the input based on the representation 210.

For example, the noise model based on the auto-encoder is trained by using an objective function represented by the following Equation 4.

$$L = \frac{1}{2}\sum_{k} \|x_k - z_k\|^2,\qquad\text{[Equation 4]}$$

wherein $x_k$ indicates input, $z_k$ indicates output, and K indicates a sample index of the noise data for acoustic model training.

In an embodiment, a number of nodes of hidden layers in the middle of auto-encoder is desired to be smaller than the dimension of an input/output, or a constraint of sparseness, such as an L1 norm, is desired. For example, in the case where 123 filterbanks (41 dim static filterbank+delta+delta-delta) are input, the number of nodes of hidden layers in the middle of auto-encoder is set to be 40, which is smaller than 123. By training using the auto-encoder, the same effect as dimension reduction may be achieved, and the noise model is trained to calculate an input representation that represents an input.

The auto-encoder includes an encoder 220 that converts an input into a representation, and a decoder 230 that converts the representation into an output. The encoder 220 and the decoder 230 are each structural devices including, but not limited to, a processor, a controller, or a circuit. The noise model may be generated by removing the decoder 230 from the trained auto-encoder. That is, the noise model may be configured to include only the encoder 220.

Figure 3:
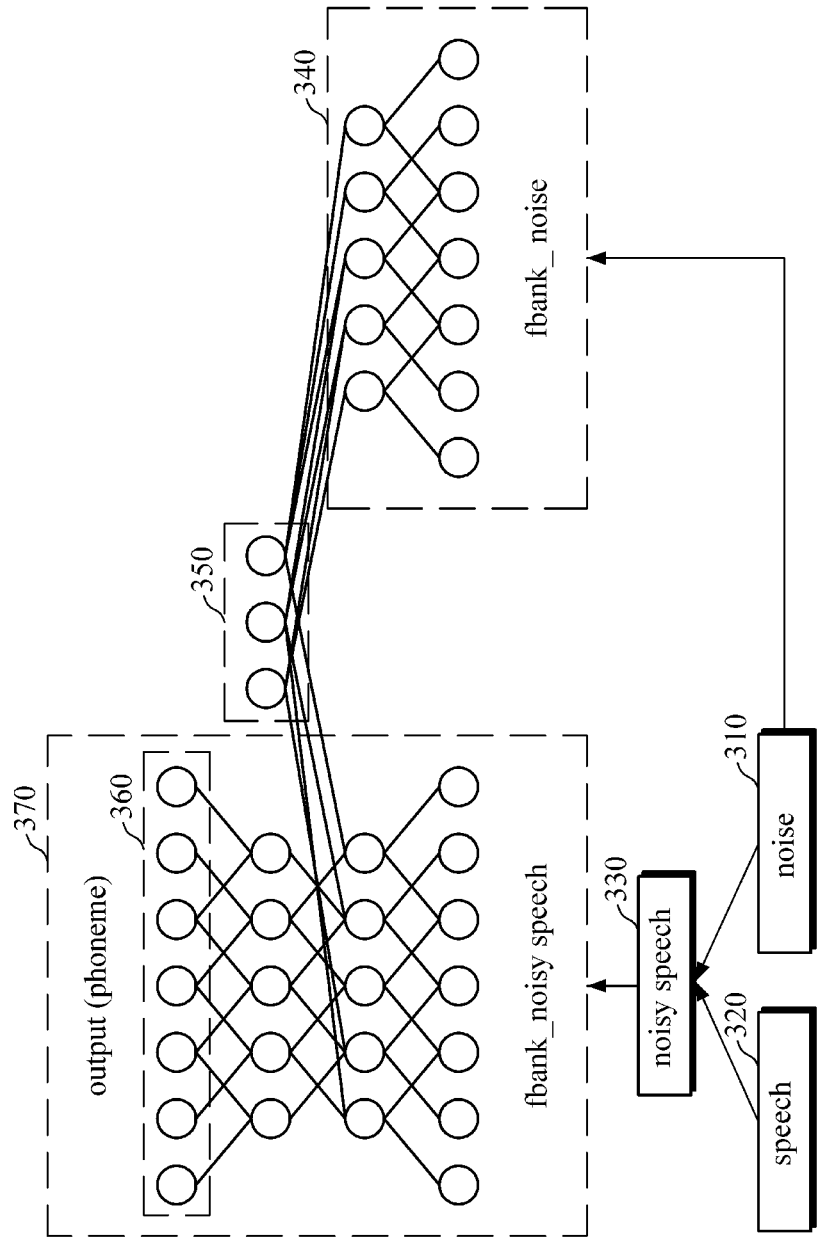
FIG. 3 is a diagram explaining an example of generating an acoustic model, in accordance with an embodiment.

FIG. 3 is a diagram explaining an example to generate an acoustic model, in accordance with an embodiment.

Referring to FIG. 3, the feature extractor 121 receives noise data 310 for the acoustic model training, and extracts a feature (fbank_noise) from the noise data 310 for the acoustic model training.

The noise modeler 123 calculates a noise representation 350 that corresponds to the noise data 310 for the acoustic model training, based on the extracted feature (fbank_noise) by using a pre-generated noise model 340.

The combiner 131 combines speech data 320 for the acoustic model training with the noise data 310 for the acoustic model training, to generate noisy speech data 330 for the acoustic model training.

The feature extractor 132 receives the noisy speech data 330 for the acoustic model training, and extracts a feature (fbank_noisy_speech) from the noisy speech data 330 for the acoustic model training.

The acoustic model trainer 133 trains a speech model 370 with the feature (fbank_noisy_speech), which is defined as input data, and a string of phonemes corresponding to the speech data for the acoustic model training and the noise representation 350 of the noise data for the acoustic model training, which is defined as the target data. In other words, the acoustic model trainer 133 trains the acoustic model 370 so that the acoustic model 370 performs both phoneme classification 260 and noise representation 350 at the same time.

Figure 4:
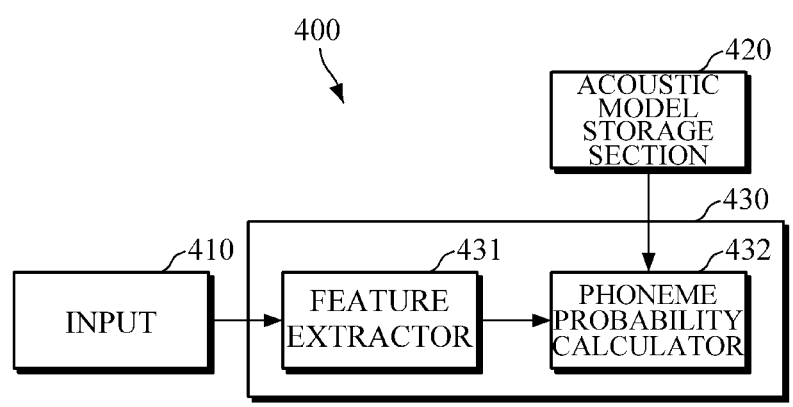
FIG. 4 is a block diagram illustrating a speech recognition apparatus, in accordance with an embodiment.

FIG. 4 is a block diagram illustrating a speech recognition apparatus, in accordance with an embodiment.

Referring to FIG. 4, the speech recognition apparatus 400 includes an input 410, an acoustic model storage section 420, and a calculator 430.

The input 410 receives input of noisy speech data, in which speech data to be recognized and noise data are combined.

The acoustic model storage section 420 stores an acoustic model that has been generated through advance training. The acoustic model may be an acoustic model generated by the apparatus 100 to generate the acoustic model illustrated in FIG. 1.

For instance, the acoustic model is an acoustic model generated through training using the speech data for the acoustic model training, the noise data for the acoustic model training, a string of phonemes corresponding to the speech data for the acoustic model training, and the noise representation of the noise data for the acoustic model training. The noise representation may be calculated by using a noise model, and the noise model may be generated through the auto-encoder based on various types of noise data for noise model training.

The acoustic model may be an acoustic model, which is based on a neural network and generated by using a multi-task learning method. In other words, the acoustic model may be an acoustic model that is generated by training using features of the noisy speech data for the acoustic model training, in which the speech data for acoustic model training and the noise data for acoustic model training are combined and defined as input data, and a string of phonemes corresponding to the speech data for the acoustic model training and the noise representation of the noise data for the acoustic model training are defined as target data. The acoustic model may be trained by using the objective functions represented by Equations 1 to 3.

The acoustic model storage section 420 may include at least one storage medium among flash memory type, hard disk type, multi-media card micro type, card type memory (e.g., SD or XD memory, etc.), random access memory (RAM), static random access memory (SRAM), read-only memory (ROM), electrically erasable programmable read only memory (EEPROM), programmable read only memory (PROM), magnetic memory, magnetic disks, optical discs, and other similar storage structural devices.

The calculator 430 calculates phoneme probabilities of the noisy speech data input by using the stored acoustic model. To this end, the calculator 430 includes a feature extractor 431 and a phoneme probability calculator 432.

In accordance with an embodiment, the feature extractor 431 extracts features of the noisy speech data input by using an algorithm. As described above, the algorithm may be an algorithm of any type or function as long as the algorithm may be used to extract features that differentiate the noisy speech data from other noisy speech data.

The phoneme probability calculator 432 calculates a phoneme probability, corresponding to a feature of the noisy speech data that is extracted by the feature extractor 431, by using the stored acoustic model.

Although the speech recognition apparatus 400 includes the input 410 and the acoustic model storage section 420 in FIG. 4, the input 410 and the noise model storage section 420 are structural elements that may be omitted depending on performance and use of a system.

Figure 5:
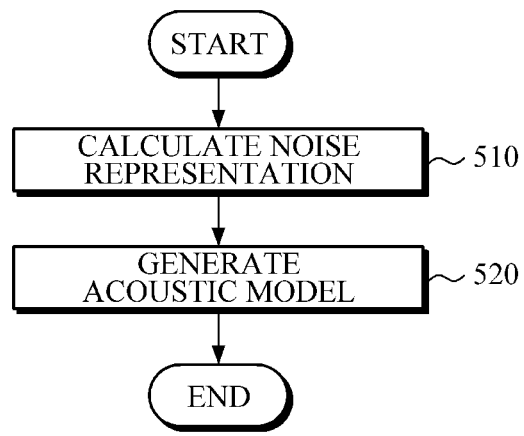
FIG. 5 is a flowchart illustrating a method of generating an acoustic model, in accordance with another embodiment.

FIG. 5 is a flowchart illustrating a method to generate an acoustic model, according to another embodiment.

Referring to FIGS. 1 and 5, in operation 510, the apparatus 100 to generate an acoustic model calculates, using the noise representation calculator 120, a noise representation that represents noise data for acoustic model training by using a pre-generated noise model.

The noise model is generated by training, in advance, through the auto-encoder using various noise data for noise model training. The noise data for noise model training includes all types of noise data having noise data for acoustic model training that is used to generate an acoustic model.

Generation of the noise model is described with reference to FIG. 2, such that detailed descriptions thereof will be omitted.

At operation 520, the apparatus 100 to generate the acoustic model, using the acoustic model generator 130, generates the acoustic model based on the speech data for the acoustic model training, the noise data for the acoustic model training, a string of phonemes corresponding to the speech data for the acoustic model training, and the noise representation of the noise data for the acoustic model training.

Figure 6:
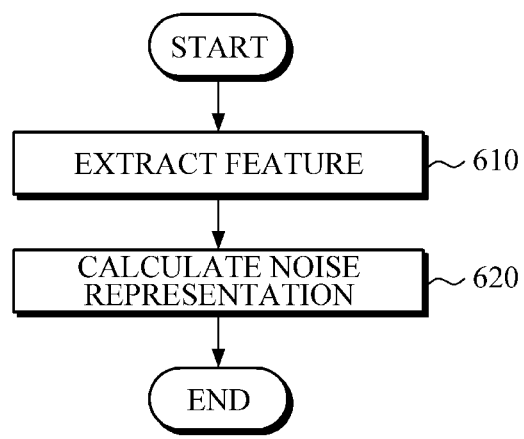
FIG. 6 is a flowchart illustrating an example of calculation of noise representation illustrated in FIG. 5.

FIG. 6 is a flowchart illustrating the calculation in 510 of noise representation illustrated in FIG. 5.

Referring to FIGS. 1 and 6, at operation 610, the apparatus 100 to generate an acoustic model extracts, using the feature extractor 121, a feature of the noise data for acoustic model training by using an algorithm. The algorithm may be an algorithm of any type or function as long as the algorithm may be used to extract features that differentiate the noise data for acoustic model training from other noise data.

At operation 620, the apparatus 100 to generate the acoustic model, using the noise modeler 123, calculates a noise representation, which represents the noise data for the acoustic model training, based on the extracted feature of the noise data for the acoustic model training.

Figure 7:
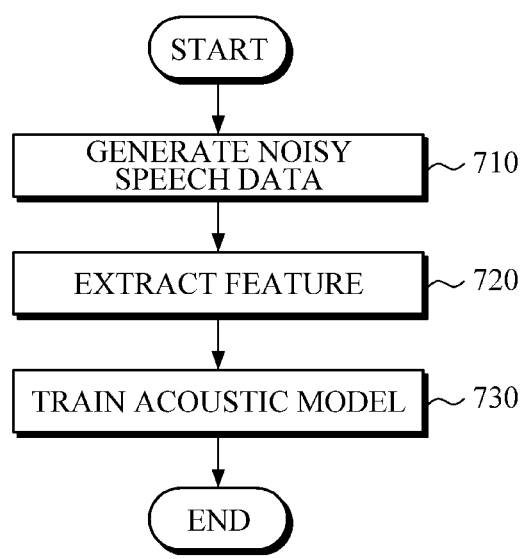
FIG. 7 is a flowchart illustrating an example of generation of an acoustic model illustrated in FIG. 5.

FIG. 7 is a flowchart illustrating the generation in 520 of an acoustic model illustrated in FIG. 5.

Referring to FIGS. 1 and 7, the apparatus 100 to generate the acoustic model, using the combiner 131, combines the speech data for the acoustic model training and the noise data for the acoustic model training to generate noisy speech data for the acoustic model training.

At operation 720, the apparatus 100 to generate the acoustic model extracts, using a features extractor 132, a feature of the noisy speech data for the acoustic model training by using an algorithm. As described above, the algorithm may be an algorithm of any type or function as long as the algorithm may be used to extract features that differentiate the noisy speech data for acoustic model training from other noisy speech data.

At operation 730, the apparatus 100 to generate the acoustic model trains, using the acoustic model trainer 133, an acoustic model with a feature of the noisy speech data for acoustic model training being defined as input data, and a string of phonemes corresponding to the speech data for acoustic model training and the noise representation of the noise data for acoustic model training being defined as target data. In other words, the apparatus 100 to generate the acoustic model trains, using the acoustic model trainer 133, the acoustic model so that the acoustic model performs both phoneme classification and noise representation at the same time by using a multi-task learning method.

The acoustic model may be an acoustic model based on a neural network, but is not limited thereto.

The neural network-based acoustic model may include a plurality of hidden layers, and may be trained by a typical error back propagation method.

In an embodiment, the apparatus 100 to generate the acoustic model may train the acoustic model by using the objective functions represented by Equations 1 to 3.

Figure 8:
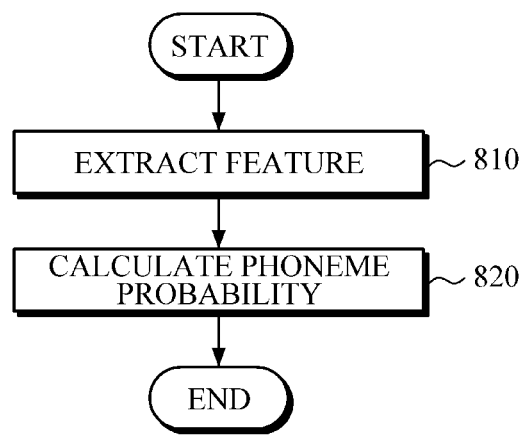
FIG. 8 is a flowchart illustrating a speech recognition method, in accordance with an embodiment.

FIG. 8 is a flowchart illustrating a speech recognition method, in accordance with an embodiment.

Referring to FIGS. 4 and 8, in operation 810, the speech recognition apparatus 400 extracts, using the feature extractor 431, a feature from the noisy speech data by using an algorithm. As described above, the algorithm may be an algorithm of any type or function as long as the algorithm may be used to extract features that differentiate the noisy speech data for acoustic model training from other noisy speech data.

At operation 820, the speech recognition apparatus 400 calculates, using a phoneme probability calculator 432, a phoneme probability that corresponds to the extracted noisy speech data, by using an acoustic model.

The acoustic model may be an acoustic model generated by training based on the speech data for the acoustic model training, the noise data for the acoustic model training, a string of phonemes corresponding to the speech data for the acoustic model training, and the noise representation of the noise data for the acoustic model training. The noise representation may be calculated by using a noise model, and the noise model may be generated through the auto-encoder based on various types of noise data for noise model training.

The acoustic model may be an acoustic model, which is based on a neural network, and generated by using a multi-task learning method. In other words, the acoustic model may be an acoustic model that is generated by being trained with features of the noisy speech data for the acoustic model training, in which the speech data for acoustic model training and the noise data for acoustic model training are combined and defined as input data, and a string of phonemes corresponding to the speech data for the acoustic model training and the noise representation of the noise data for the acoustic model training and defined as target data. The acoustic model may be trained by using the objective functions represented by Equations 1 to 3.

Figure 9:
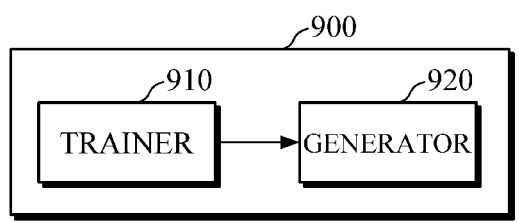
FIG. 9 is a block diagram illustrating an apparatus to generate a noise model, in accordance with an embodiment.

FIG. 9 is a block diagram illustrating an apparatus to generate a noise model, in accordance with an embodiment.

Referring to FIG. 9, the apparatus 900 to generate the noise model includes a trainer 910 and a generator 920.

The trainer 910 is a processor, a circuit, or a controller configured to train an auto-encoder by using various training noise data. The auto-encoder includes an encoder, which converts an input into representation, and a decoder, which converts the representation into an output.

In an embodiment, the trainer 910 trains the auto-encoder by using the objective function of Equation 4.

The generator 920 is a processor, a circuit, or a controller configured to generate a noise model by removing the decoder from the auto-encoder.

Figure 10:
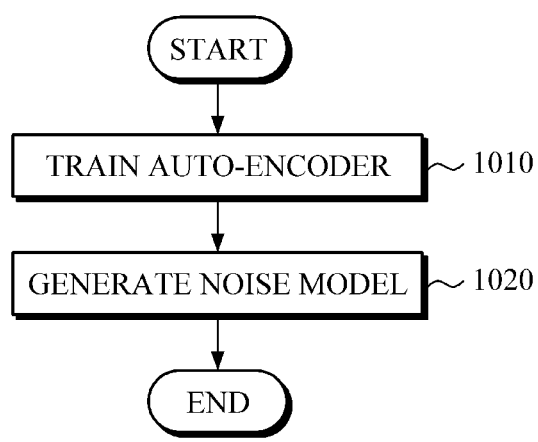
FIG. 10 is a flowchart illustrating a method to generate a noise model, in accordance with an embodiment.

FIG. 10 is a flowchart illustrating a method to generate a noise model, in accordance with an embodiment.

Referring to FIGS. 9 and 10, at operation 1010, the apparatus 900 to generate the noise model trains the auto-encoder, using the trainer 910, by using various training noise data. The auto-encoder includes an encoder, which converts an input into representation, and a decoder, which converts the representation into an output.

In an embodiment, the apparatus 900 to generate the noise model trains the auto-encoder by using the objective function of Equation 4.

At operation 1020, the apparatus 900 to generate the noise model generates, using the generator 920, a noise model by removing the decoder from the auto-encoder in 1020.

The input 110, noise representation calculator 120, the feature extractor 121, the noise modeler 123, the noise model storage section 122, the acoustic model generator 130, the combiner 131, the feature extractor 132, the acoustic model trainer 133, the input 410, the feature extractor 431, the acoustic model storage section 420, the phoneme probability calculator 432, the trainer 910, and the generator 920 in FIGS. 1, 4, and 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-8 and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for generating an acoustic model for speech recognition, the apparatus comprising:
a processor configured to:
identify training noisy speech data, which includes training speech data to which training noise data has been added, and identify the training noise data;
determine a noise representation of the identified training noise data by extracting features from the identified training noise data using a noise model and calculating the noise representation based on analyses of the extracted features; and
generate the acoustic model, for the speech recognition, through training using the training noisy speech data, and based on a string of phonemes corresponding to the identified training speech data, and the determined noise representation as respective targets of the training, so the generated acoustic model is configured to concurrently perform classification of a string of phonemes corresponding to a speech for the speech recognition and to perform extraction of a noise representation included in the speech.

2. The apparatus of claim 1, further comprising a memory storing instructions, wherein the processor is further configured to execute the instructions to configure the processor to:
perform the identifying of the training noisy speech data, and the identifying of the training noise data;
perform the determining of the noise representation; and
perform the generating of the acoustic model.

3. The apparatus of claim 1, wherein the noise model is generated in advance through an auto-encoding processor using training noise data.

4. The apparatus of claim 1, wherein the generated acoustic model is a neural network acoustic model.

5. The apparatus of claim 1, wherein the processor is configured to generate the acoustic model by using a multi-task learning method.

6. The apparatus of claim 1, wherein the processor generates the acoustic model by using a third objective function obtained from a weighted sum of a first objective function and a second objective function, wherein the first objective function is used to estimate a phoneme probability, and the second objective function is used to estimate the noise representation.

7. The apparatus of claim 1, wherein the processor is further configured to:
combine the identified training speech data and the identified training noise data to generate the training noisy speech data;
extract a feature of the generated training noisy speech data; and
train the acoustic model with the extracted feature, the string of phonemes corresponding to the identified training speech data, and the determined noise representation.

8. A processor-implemented method of generating an acoustic model for speech recognition, the method comprising:
- identifying training noisy speech data, which includes training speech data to which training noise data has been added, and identify the training noise data;
- determining a noise representation of the identified training noise data by extracting features from the identified training noise data using a noise model and calculating the noise representation based on analyses of the extracted features; and
- generating the acoustic model, for the speech recognition, through training using the training noisy speech data, and based on a string of phonemes corresponding to the identified training speech data, and the determined noise representation as respective targets of the training, so the generated acoustic model is configured to concurrently perform classification of a string of phonemes corresponding to a speech for the speech recognition and to perform extraction of a noise representation included in the speech.

9. The method of claim 8, wherein the noise model is generated in advance through an auto-encoding processor using training noise data.

10. The method of claim 8, wherein the generated acoustic model is a neural network acoustic model.

11. The method of claim 8, wherein the generating of the acoustic model comprises generating the acoustic model by using a multi-task learning method.

12. The method of claim 11, wherein the generating of the acoustic model comprises generating the acoustic model by using a third objective function obtained from a weighted sum of a first objective function and a second objective function, wherein the first objective function is used to estimate a phoneme probability, and the second objective function is used to estimate the noise representation.

13. The method of claim 8, wherein the generating of the acoustic model comprises:
- combining the identified training speech data and the identified training noise data to generate the training noisy speech data;
- extracting a feature of the generated training noisy speech data; and
- training the acoustic model with the extracted feature, the string of phonemes corresponding to the speech data, and the determined noise representation.

14. A speech recognition apparatus, comprising:
a processor configured to:
- determine a phoneme probability of input noisy speech data by using an acoustic model stored in a memory of the speech recognition apparatus; and
- generate a speech recognition result by performing speech recognition based on the determined phoneme probability of the input noisy speech data,
wherein the acoustic model is generated by:
- identifying training noisy speech data, which includes training speech data to which training noise data has been added, and identify the training noise data,
- determining a noise representation of the identified training noise data by extracting features from the identified training noise data using a noise model and by calculating the noise representation based on analyses of the extracted features, and
- training the acoustic model using the training noisy speech data, and based on a phoneme probability corresponding to the identified training speech data, and the determined noise representation as respective targets of the training, so the generated acoustic model is configured to concurrently perform classification of a string of phonemes corresponding to the input noisy speech data for the speech recognition and to perform extraction of a noise representation included in the input noisy speech data.

15. The apparatus of claim 14, wherein the processor is further configured to:
- extract a feature of the input noisy speech data; and
- determine a phoneme probability corresponding to the extracted feature, using the acoustic model.

16. The apparatus of claim 14, wherein the noise representation is determined by using the noise model.

17. The apparatus of claim 16, wherein the noise model is generated in advance through an auto-encoding processor using the training noise data.

18. The apparatus of claim 14, wherein the acoustic model is a neural network acoustic model.

19. The apparatus of claim 14, wherein the acoustic model is generated by using a multi-task learning method.

20. The apparatus of claim 19, wherein the acoustic model is generated by using a third objective function obtained from a weighted sum of a first objective function and a second objective function, wherein the first objective function is used to estimate a phoneme probability, and the second objective function is used to estimate the noise representation.

21. The apparatus of claim 14, wherein the acoustic model is generated with the training noisy speech data being defined as input data.

22. A processor-implemented method of performing speech recognition, comprising:
- extracting a feature of input noisy speech data;
- determining a phoneme probability, corresponding to the extracted feature, by using an acoustic model; and
- generating a speech recognition result by performing the speech recognition based on the determined phoneme probability corresponding to the extracted feature,
wherein the acoustic model is generated by:
- identifying training noisy speech data, which includes training speech data to which training noise data has been added, and identify the training noise data;
- determining a noise representation of the identified training noise data by extracting features from the identified training noise data and by calculating the noise representation based on analyses of the extracted features; and
- training the acoustic model using the training noisy speech data, and based on a phoneme probability corresponding to the identified training speech data, and the determined noise representation as respective targets of the training, so the generated acoustic model is configured to concurrently perform classification of a string of phonemes corresponding to the input noisy speech data for the speech recognition and to perform extraction of a noise representation included in the input noisy speech data.

23. The method of claim 22, wherein the noise representation is determined by using a noise model.

24. The method of claim 23, wherein the noise model is generated in advance through an auto-encoding processor using the training noise data.

25. The method of claim 22, wherein the acoustic model is a neural network acoustic model.

26. The method of claim 22, wherein the acoustic model is generated by using a multi-task learning method.

27. The method of claim 26, wherein the acoustic model is generated by using a third objective function obtained from a weighted sum of a first objective function and a second objective function, wherein the first objective function is used to estimate a phoneme probability, and the second objective function is used to estimate the noise representation.

28. The method of claim 22, wherein the acoustic model is generated with the training noisy speech data being defined as input data.

29. An apparatus for generating an acoustic model for speech recognition, comprising:
a processor configured to:
combine training speech data and training noise data to generate training noisy speech data;
identify the training noisy speech data, which includes the training speech data to which the training noise data has been added, and identify the training noise data;
determine a noise representation of the identified training noise data by extracting features from the identified training noisy speech data and by calculating the noise representation based on analyses of the extracted features; and
train the acoustic model, generated for the speech recognition, with the extracted features from the training noisy speech data, and based on a string of phonemes corresponding to the identified training speech data, and the determined noise representation as respective targets of the training, wherein classification of the phonemes and extraction of the noise representation are concurrently performed by the acoustic model.

30. The apparatus of claim 29, further comprising:
an auto-encoding processor configured to receive input of features to calculate an input representation based on received input of training speech data, and reconstruct output that is most similar to the input based on the input representation.

31. The apparatus of claim 30, wherein the auto-encoding processor generates in advance the noise model using the training noise data.

32. The apparatus of claim 29, wherein the generated acoustic model is a neural network acoustic model.

33. An apparatus to generate a neural network acoustic model, the apparatus comprising:
a processor configured to:
determine a noise representation of each of plural input noise data by applying a noise model to each of the plural input noise data; and
generate the neural network acoustic model through repeated implementations of the neural network acoustic model input respective training noisy speech data, which each comprises a combination of corresponding input speech data and corresponding input noise data of the plural input noise data, and through respective considerations of respective strings of phonemes predetermined to correspond to the corresponding input speech data, and the determined noise representation of each of the plural input noise data,
wherein the respective strings of phonemes and the determined noise representations are respective training targets in the repeated implementations of the neural network acoustic model, so the generated neural network acoustic model is configured to concurrently perform classification of a string of phonemes corresponding to a speech for a speech recognition and to perform extraction of a noise representation included in the speech.

34. The apparatus of claim 33, wherein the repeated implementations of the neural network acoustic model are implemented through an error back propagation approach.

* * * * *